A. S. WHITTEMORE.

Assignor to the Whittemore Thrashing Machine Co.

THRASHING-MACHINE.

No. 7,363. Reissued Oct. 24, 1876.

Witnesses:
Michael Rosen,
Fred. Haynes

A. S. Whittemore
by his Attorneys
Brown & Allen

N. PETERS, PHOTO-LITHOGRAPHER, WASHINGTON, D. C.

UNITED STATES PATENT OFFICE.

ALBERT S. WHITTEMORE, OF WILLIMANTIC, CONNECTICUT, ASSIGNOR TO THE WHITTEMORE THRASHING MACHINE COMPANY, OF SAME PLACE.

IMPROVEMENT IN THRASHING-MACHINES.

Specification forming part of Letters Patent No. 74,650, dated February 18, 1868; reissue No. 3,403, dated April 27, 1869; reissue No. 7,363, dated October 24, 1876; application filed December 10, 1874.

*To all whom it may concern:*

Be it known that I, ALBERT S. WHITTEMORE, of Willimantic, in the county of Windham and State of Connecticut, have invented a new and useful Improvement in Thrashing-Machines; and I do hereby declare that the following is a full, clear, and exact description thereof, reference being had to the accompanying drawings, forming part of this specification, in which—

Figure 1:
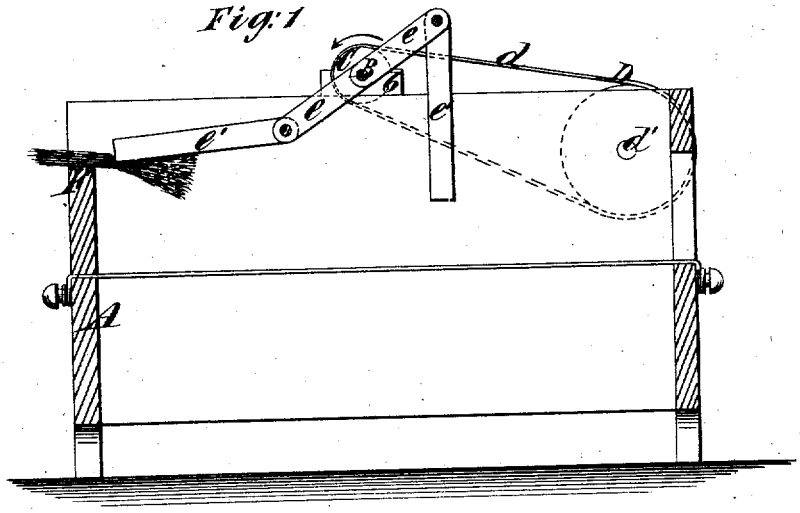
Figure 2:
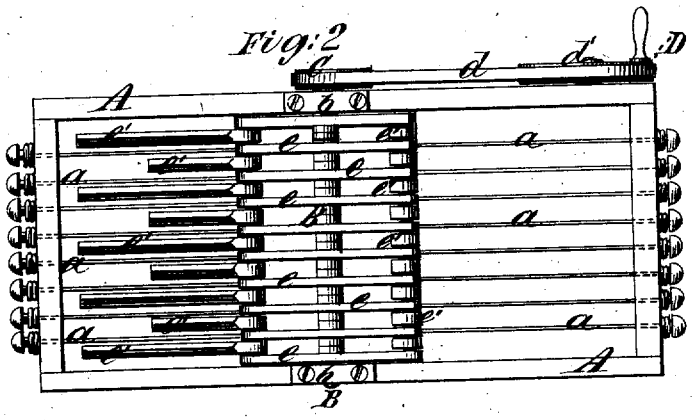

Figure 1 is a central vertical section of a thrashing-machine constructed according to my invention. Fig. 2 is a plan of the same.

This invention relates to thrashing-machines in which rotary flails are used; and its object is to effect the thrashing or opening operation more rapidly and effectually, and with less expenditure of power.

The principal feature of the invention consists in providing, for the support of the grain or matter being thrashed or opened, a bearing just out of reach of the flails, that the latter may operate upon the matter to be thrashed or opened while it is presented over and beyond the said bearing, and while receiving no support directly below the point of operation of the flails.

The invention further consists in a novel arrangement of the flails and other working parts of the machine, in relation with said fixed bearing, whereby an efficient machine for thrashing or opening vegetable substances is obtained.

A is the frame of the machine, of box-like construction, having provided upon its upper part journal-boxes *b*, for the reception of the rotary flail-shaft B, which is arranged crosswise of the frame. Upon this shaft are firmly secured, at short and equal distances apart, rigid arms *e e*, to the ends of which are pivoted the flails *e′ e′*, of which and the arms *e e* there may be any suitable number. D is a driving-pulley, fitted to rotate upon a fixed stud, *d′*, and serving to drive the flail-shaft B in the direction of the arrow shown in Fig. 1, by means of a belt, *d*, running around it and around a pulley, C, on the flail-shaft. F is the fixed bearing, upon which the grain or matter to be thrashed or opened is supported during the thrashing operation, the said bearing being represented as formed by the upper edge of that end of the frame toward which the flails fall during their rotary motion, produced by the rotation of the shaft B, and which is the end of the machine at which the grain or matter to be thrashed or opened is fed in.

The said bearing may, however, be constructed or formed in any other way, in such position, as represented, that the flails, though approaching near to cannot strike the said bearing, the level of which I prefer to be a little lower than that of the flail-shaft. At some distance below the bearing F, and extending horizontally and longitudinally the whole length of the frame A, there is represented in the drawings a series of wires, *a a*, serving as a screen-like platform for the reception of the straw and grain or other matter to be thrashed or opened after having passed over the bearing F, and been subjected to the thrashing or opening operation while supported thereon.

The operation of this machine is conducted in the following manner: Rotary motion being imparted to the flail-shaft and flails in the direction of the arrow shown in Fig. 1, either by means of hand-power applied to the pulley D, or by other means, the grain or matter to be thrashed or opened is fed into the machine over the bearing F, either loose or in bundles, taking care, as a rule, to place the straw or stalk parallel with the planes of rotation of the flails, so that the heads of the grain may be allowed to project over the said bearing toward the flails, and to remain so projecting while the flails operate thereon. The straw or stalks, as they are thrashed out, are pushed forward and allowed to fall over the said bearing, and are carried forward on the wires *a a* by the action of the flails, to make room for a fresh supply, to be fed in the same manner. As the grain is thrashed the kernels fall through the wire screen *a a*, while the straw is carried forward thereon by the action of the flails, any accumulation thereon, if any occur, being removed by hand by drawing it out at the end of the machine opposite to that at which the bearing F is situated.

Whatever materials are subjected to the thrashing and opening operation of the machine may in like manner be carried forward and discharged by the action of the flails, with or without other assistance.

What I claim as new, and desire to secure by Letters Patent, is—

1. In combination with the rotary flails, the bearing F, for the support of the matter being thrashed or opened, araanged at a point beyond the reach of the flails, substantially as and for the purpose herein described.

2. The thrashing-machine constructed as described, the same consisting of a frame, A, having a bearing, F, shaft B, arms *e e*, and flails *e′ e′*, said bearing F being beyond the reach of the flails, substantially as herein described.

ALBERT S. WHITTEMORE.

Witnesses:
NOAH D. WEBSTER,
J. R. ARNOLD.